United States Patent
Lo (10) Patent No.: US 8,866,990 B2
(45) Date of Patent: Oct. 21, 2014

(54) DISPLAY AND FRAME STRUCTURE THEREOF

(75) Inventor: Wen-Kuo Lo, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 83 days.

(21) Appl. No.: 13/477,170

(22) Filed: May 22, 2012

(65) Prior Publication Data

US 2013/0021727 A1 Jan. 24, 2013

(30) Foreign Application Priority Data

Jul. 22, 2011 (TW) .............. 100125925 A (51) Int. Cl.
*G02F 1/1333* (2006.01)
*H04N 13/04* (2006.01)

(52) U.S. Cl.
CPC ...... *G02F 1/133308* (2013.01); *H04N 13/0409* (2013.01); *H04N 2213/001* (2013.01); *H04N 13/0404* (2013.01); *G02F 2001/133322* (2013.01)
USPC .............................. 349/60; 349/58

(58) Field of Classification Search
CPC .............................. G02F 2201/503
USPC ......................................... 349/60
See application file for complete search history.

(56) References Cited

U.S. PATENT DOCUMENTS

2007/0115401 A1* 5/2007 Tsubokura et al. ............ 349/58

FOREIGN PATENT DOCUMENTS

| TW | I318318 | 12/2009 |
|----|---------|---------|
| TW | 201035823 | 10/2010 |

OTHER PUBLICATIONS

English translation of abstract of TW I318318.
English translation of abstract of TW 201035823.

* cited by examiner

*Primary Examiner* — Wen-Ying P Chen
(74) *Attorney, Agent, or Firm* — McClure, Qualey & Rodack, LLP (57) ABSTRACT

A display and a frame structure thereof are disclosed. The frame structure includes a first sidewall, at least one first convex, and at least one second convex. The first sidewall includes at least one first wall section and at least one second wall section. The first wall section and the second wall section are closely distributed along an extension direction of the first sidewall. The at least one first convex protrudes on a part of an inner surface of the first wall section. The at least one second convex protrudes on a part of an inner surface of the second wall section. A protruding position of the first convex is closer to a wall foot of the first sidewall than a protruding position of the second convex.

26 Claims, 7 Drawing Sheets

DISPLAY AND FRAME STRUCTURE THEREOF

BACKGROUND OF THE INVENTION

1. Field of the Invention

The invention relates to a display, in particular, to a 3D liquid crystal display and a frame structure thereof with a design of rubber frame wall having different widths at different positions to prevent the frame glue between the color filter substrate and the thin-film transistor substrate from being separated by force.

2. Description of the Prior Art

In recent years, with the continuous progress of display technology, the liquid crystal display is mass produced and widely used. It is no doubt that the liquid crystal display has become the mainstream of the flat panel display technology. In addition, because the 3D image contents such as 3D movies and 3D video games are continuously released in the market, the trend that the 3D image display development has entered into the family and personal market from the movie theater is reflected. Therefore, various manufacturers develop and manufacture LCD apparatuses with 3D display function to meet consumer's demand.

Figure 1:
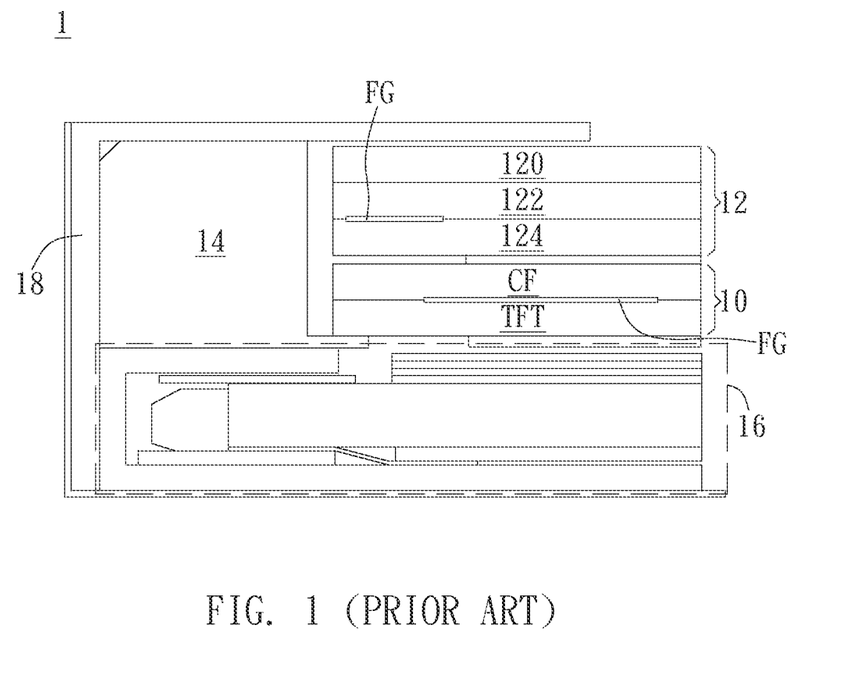
FIG. 1 illustrates a cross-sectional view of the 3D liquid crystal display in the prior art.

In general, as shown in FIG. 1, 3D actuation elements 12 (a liquid crystal polymer (LCP) lens film 120, an upper switching unit 122, and a lower switching unit 124) are often directly adhered on the display panel 10 (a color filter substrate CF and a thin-film transistor substrate TFT) of the 3D liquid crystal display 1 released in the market to achieve 3D display effect. Wherein, the color filter substrate CF and the thin-film transistor substrate TFT of the display panel 10 are adhered together by the frame glue FG, and the upper switching unit 122 and the lower switching unit 124 are also adhered together by the frame glue FG.

Figure 2:
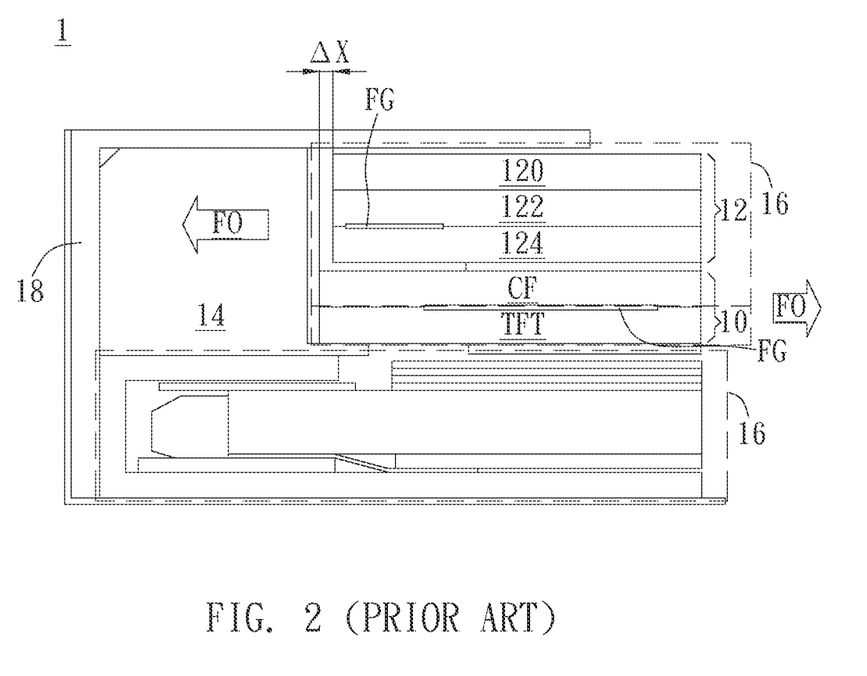
FIG. 2 illustrates a cross-sectional view of the 3D liquid crystal display shown in FIG. 1 being performed by a shock test of percent reduction in area.

However, as shown in FIG. 2, once the edges of the 3D actuation element 12 and the display panel 10 are not aligned, there will be a distance existed between the edge of the 3D actuation element 12 and the edge of the display panel 10. Under the effect of the increased weight of the 3D actuation element 12, when the shock test of percent reduction in area is performed, the reaction force acted on the display panel 10 will be enlarged at the same time. At this time, the weight of the 3D actuation element 12 will pull the color filter substrate CF, and the frame glue FG between the color filter substrate CF and the thin-film transistor substrate TFT will be separated by a horizontal shear stress, so that the frame glue FG will fail to adhere the color filter substrate CF and the thin-film transistor substrate TFT, and the display of the 3D liquid crystal display 1 will become abnormal.

SUMMARY OF THE INVENTION

Therefore, a scope of the invention is to provide a display and a frame structure thereof to solve the above-mentioned problems occurred in the prior arts.

An embodiment of the invention is a frame structure. In this embodiment, the frame structure includes a first sidewall, at least one first convex, and at least one second convex. The first sidewall includes at least one first wall section and at least one second wall section. The first wall section and the second wall section are closely distributed along an extension direction of the first sidewall. The at least one first convex protrudes on a part of an inner surface of the first wall section. The at least one second convex protrudes on a part of an inner surface of the second wall section. A protruding position of the first convex is closer to a wall foot of the first sidewall than a protruding position of the second convex.

Another embodiment of the invention is a display. In this embodiment, the display includes a frame structure and a composite panel. The frame structure includes a plurality of sidewalls, a first convex, and a second convex. The plurality of sidewalls encloses an inner space of the frame structure. A first sidewall of the plurality of sidewalls includes a first wall section and a second wall section. The first wall section and the second wall section are closely distributed along an extension direction of the first sidewall. The first convex protrudes on a part of an inner surface of the first wall section. The second convex protrudes on a part of an inner surface of the second wall section. A protruding position of the first convex is closer to a wall foot of the first sidewall than a protruding position of the second convex. The composite panel is enclosed by the frame structure. The composite panel includes a first panel and a second panel. The first panel has a first end surface toward the first convex. The second panel is superimposed on the first panel, and the second panel has a second end surface toward the second convex.

Compared to the prior art, the display and the frame structure thereof disclosed by the invention can effectively disperse the force originally acted on the composite panel of the display by using the design of the rubber frame wall having different widths at different positions, therefore, it can prevent the frame glue between the color filter substrate and the thin-film transistor substrate from being separated by force, and the 3D liquid crystal display can normally display image without anomalies.

The advantage and spirit of the invention may be understood by the following detailed descriptions together with the appended drawings.

DETAILED DESCRIPTION OF THE INVENTION

A preferred embodiment of the invention is a display. In this embodiment, the display is a liquid crystal display, especially a 3D liquid crystal display with 3D displaying function, but not limited to this case.

Figure 3A:
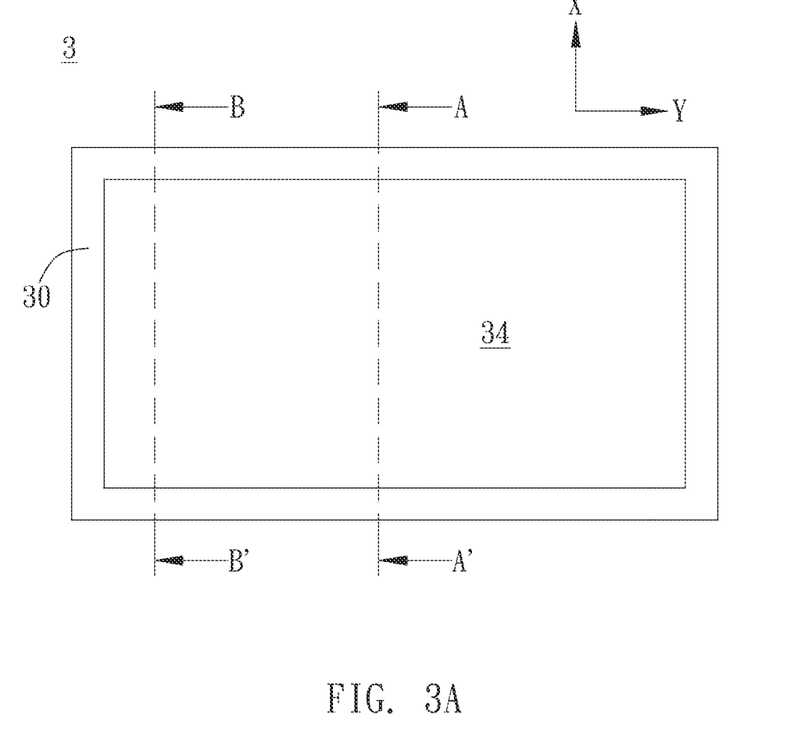
FIG. 3A illustrates a top view of the display in a preferred embodiment of the invention.
Figure 3B:
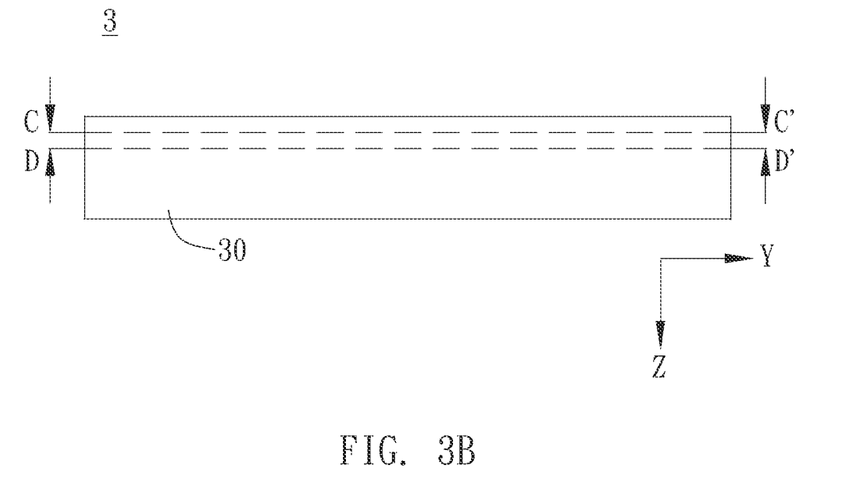
FIG. 3B illustrates a side view of the display shown in FIG. 3A.
Figure 4:
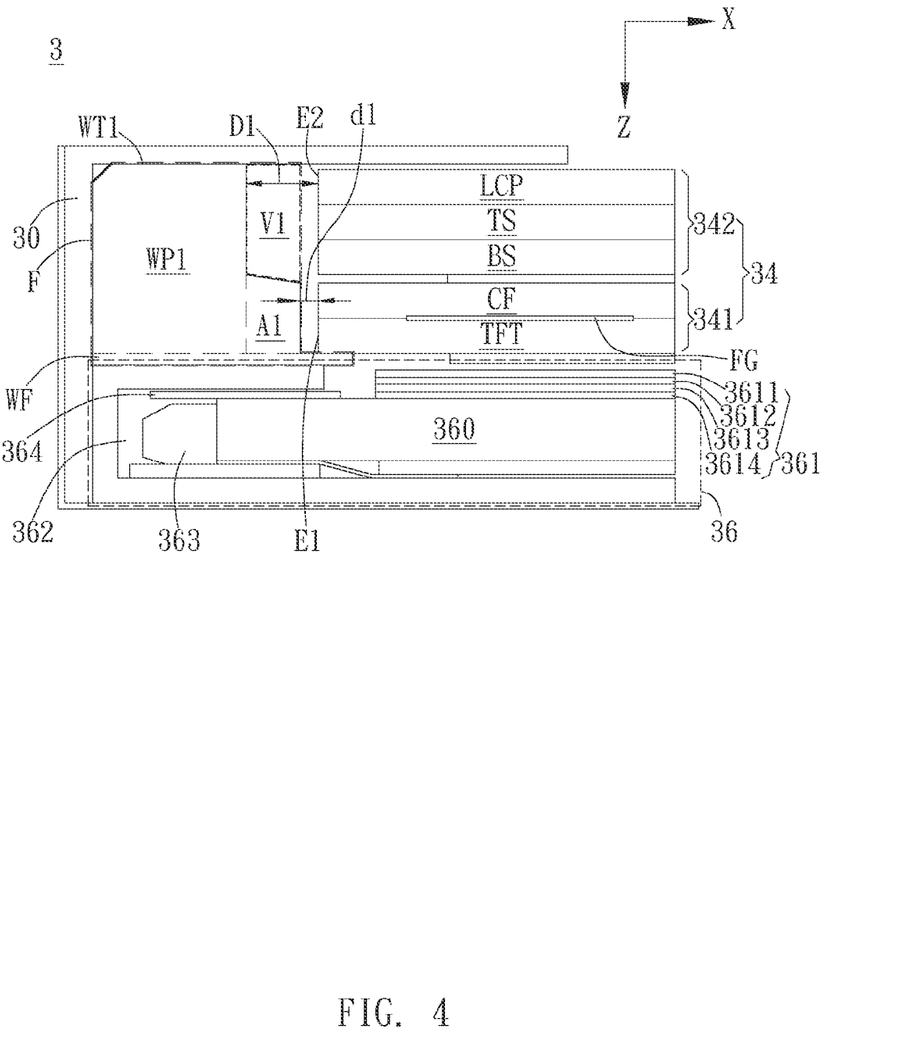
FIG. 4 illustrates a cross-sectional view of the display shown in FIG. 3A along the A-A' line.
Figure 5:
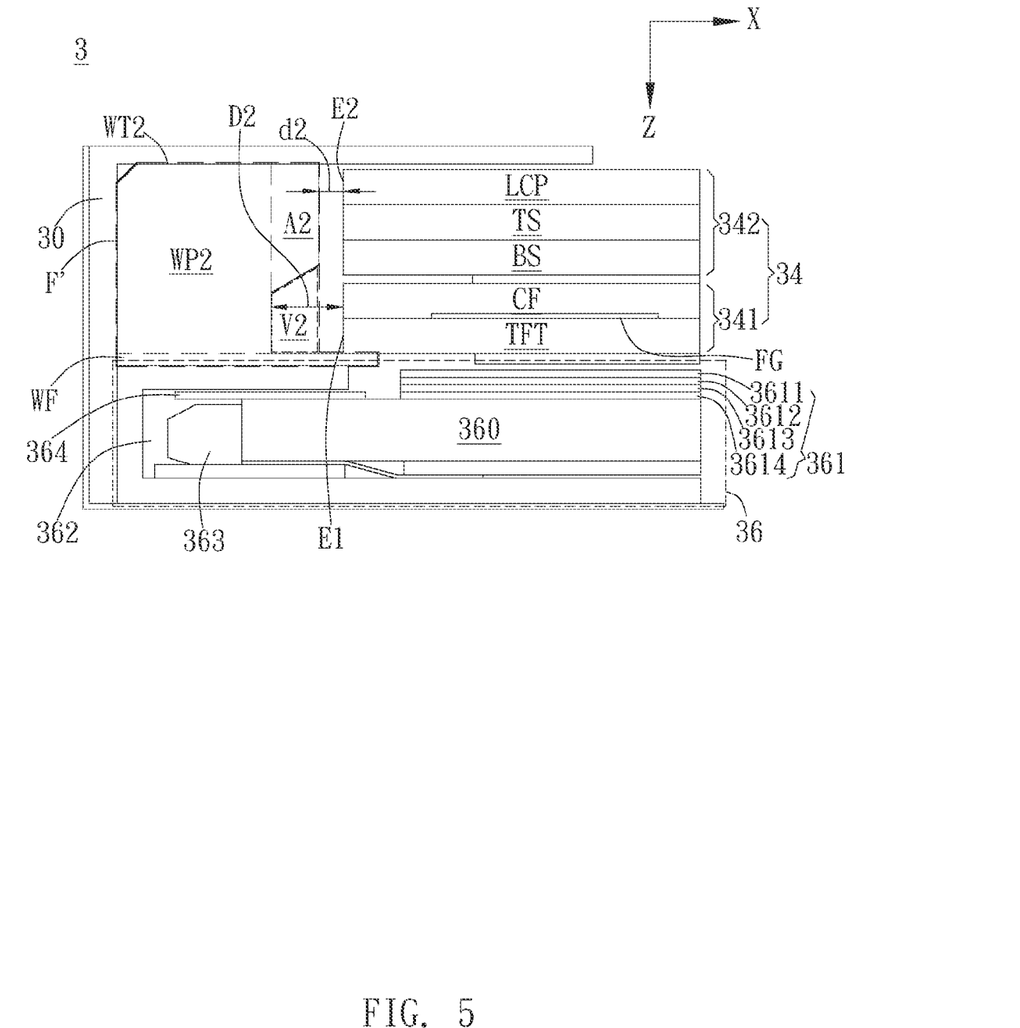
FIG. 5 illustrates a cross-sectional view of the display shown in FIG. 3A along the B-B' line.
Figure 6:
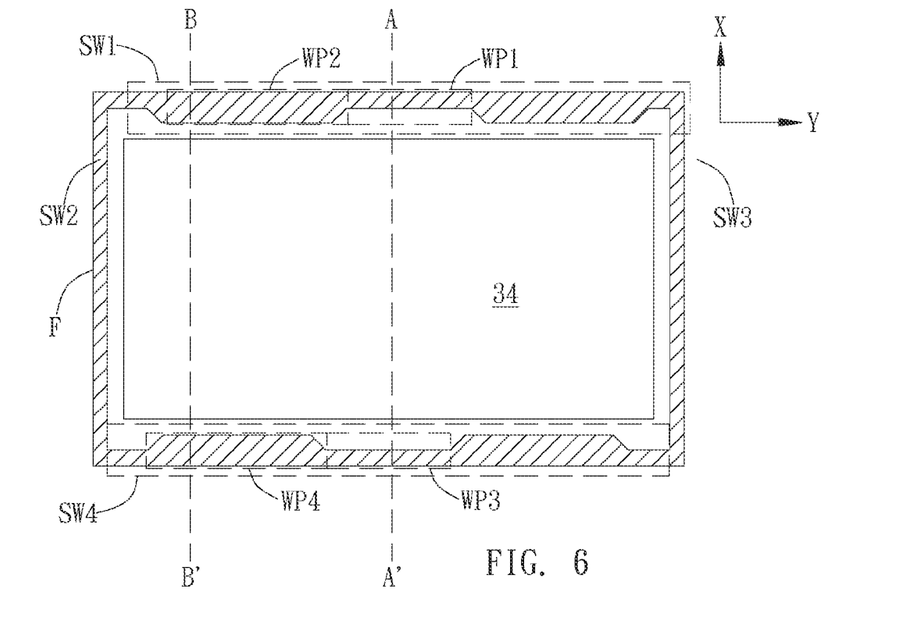
FIG. 6 illustrates a cross-sectional view of the display shown in FIG. 3B along the C-C' line.
Figure 7:
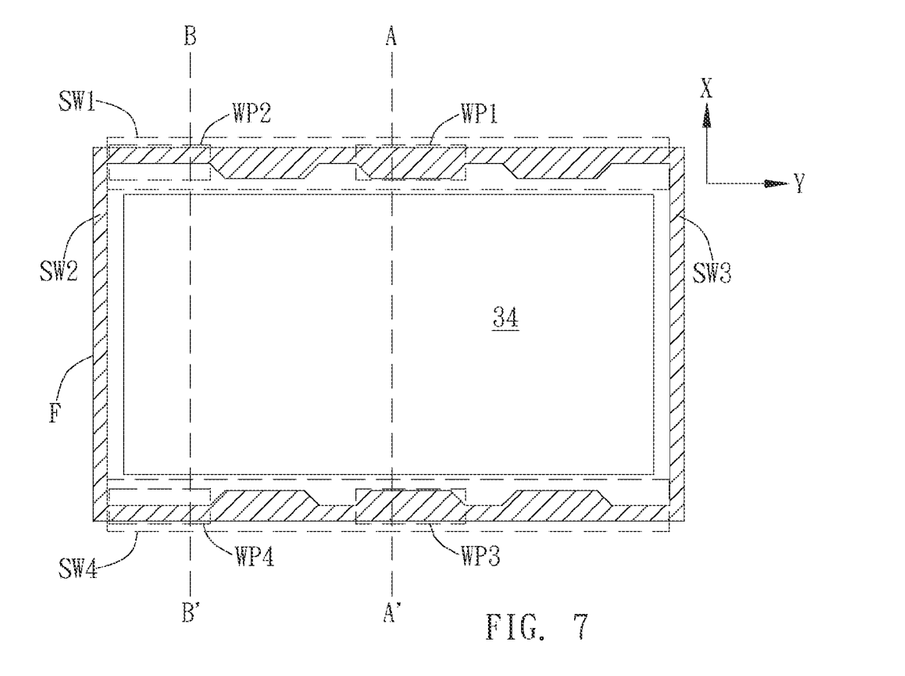
FIG. 7 illustrates a cross-sectional view of the display shown in FIG. 3B along the D-D' line.

Please refer to FIG. 3A through FIG. 7. FIG. 3A illustrates a top view of the display 3 in this embodiment; FIG. 3B illustrates a side view of the display 3; FIG. 4 illustrates a cross-sectional view of the display 3 shown in FIG. 3A along the A-A' line; FIG. 5 illustrates a cross-sectional view of the display 3 shown in FIG. 3A along the B-B' line; FIG. 6 illustrates a cross-sectional view of the display 3 shown in FIG. 3B along the C-C' line; FIG. 7 illustrates a cross-sectional view of the display 3 shown in FIG. 3B along the D-D' line. Wherein, it can be found from FIG. 3A, FIG. 6, and FIG. 7 that the cross-section of the A-A' line is near the center of the display 3, and the cross-section of the B-B' line is near the edge of the display 3; that is to say, the cross-section of the A-A' line is closer to the center of the display 3 than the cross-section of the B-B' line.

It should be noticed that since FIG. 4 and FIG. 5 illustrate cross-sectional views of the display 3 shown in FIG. 3A along different Y-axis cross-sections (the cross-section of the A-A' line and the cross-section of the B-B' line), the thickness difference of the rubber frame wall under different Y-axis cross-sections will be shown in FIG. 4 and FIG. 5; since FIG. 6 and FIG. 7 illustrate cross-sectional views of the display 3 shown in FIG. 3B along different Z-axis cross-sections (the cross-section of the C-C' line and the cross-section of the D-D' line), the thickness difference of the rubber frame wall under different Z-axis cross-sections will be shown in FIG. 6 and FIG. 7.

In fact, as shown in FIG. 6 and FIG. 7, the frame structure F includes a plurality of sidewalls SW1~SW4 enclosing an inner space of the frame structure F to contain a composite panel 34. The sidewall SW1 of the sidewalls includes at least one first wall section WP1 and at least one second wall section WP2, and at the same cross-section, the first wall section WP1 and the second wall section WP2 with different thicknesses can be closely distributed along an extension direction of the first sidewall SW1. That is to say, the first wall section WP1 and the second wall section WP2 with different thicknesses can be interlaced at the same cross-section, but not limited to this case. Wherein, the second wall section WP2 is closer to an end of the sidewall SW1 along the extension direction of the first sidewall SW1 than the first wall section WP1. That is to say, the first wall section WP1 is closer to the center of the sidewall SW1 than the second wall section WP2. In addition, it is preferred that the first wall section WP1 and the second wall section WP2 of the sidewall SW1 are symmetrically arranged, but not limited to this case.

As shown in FIG. 4, the composite panel 34 includes a first panel 341 and a second panel 342, and the second panel 342 is superimposed on the first panel 341. The composite panel 34 is disposed above the backlight module 36 and enclosed by the frame structure F. The edges of the bottom surface of the first panel 341 are carried by a wall foot WF of the frame structure F.

In practical applications, the first panel 341 includes a color filter substrate CF and a thin-film transistor substrate TFT, and the color filter substrate CF is adhered on the thin-film transistor substrate TFT through a frame glue FG. The second panel 342 includes 3D actuation elements such as a liquid crystal polymer lens film LCP, an upper switching unit TS, and a lower switching unit BS to achieve 3D display effect, but not limited to this case. For example, the second panel 342 can be also a touch module or other devices.

In this embodiment, the frame 30 in FIG. 4 is a front iron part structure; therefore, the frame 30 will cover an outer surface and an wall top WT1 of the first wall section WP1, wherein the outer surface is opposite to the inner surface and the wall top WT1 is opposite to the wall foot WF, and the frame 30 also partially shelters the outer surface of the second panel 342 and the side surface of the backlight module 36. And, the wall foot WF is carried by the backlight module 36. In fact, the frame 30 can be a rear iron part structure, and the frame 30 will cover the outer surface of the first wall section WP1 and extend into the space between the wall foot WF and the backlight module 36 from outside to support the wall foot WF.

The backlight module 36 includes a light guiding plate 360, an optical plate set 361, a frame 362, a backlight source 363, and a reflecting plate 364. The light guiding plate 360 and the backlight source 363 are adjacently disposed above the frame 362. The backlight source 363 emits lights into the light guiding plate 360. The optical plate set 361 is disposed above the light guiding plate 360. In this embodiment, the optical plate set 361 includes four layers of optical plate 3611~3614, and they are an upper diffusion film 3611, an upper prism film 3612, a lower prism film 3613, and a lower diffusion film 3614 respectively from top to bottom, but not limited to this case.

As shown in FIG. 4, in the cross-section of the display 3 formed by the A-A' line, the frame structure F includes a wall foot WF, a first wall section WP1, a first convex A1, and a first concave V1. Wherein, the first convex A1 protrudes on a part of a first inner surface of the first wall section WP1, and the first concave V1 is formed on another part of the first inner surface of the first wall section WP1 different from the first convex A1. Because the first concave V1 is located above the first convex A1, the frame structure F in the A-A' cross-section of the display 3 will show the structure of upper concave and lower convex, as shown in FIG. 6 and FIG. 7.

In this embodiment, the first panel 341 has a first end surface E1 toward the first convex A1 and the second panel 342 has a second end surface E2 toward the first concave V1. If the distance between the first end surface E1 of the first panel 341 and the first convex A1 is d1, and the distance between the second end surface E2 of the second panel 342 and the first concave V1 is D1, then it is preferred that D1 is 2~3 times of the d1, but not limited to this case.

Then, as shown in FIG. 5, in the cross-section of the display 3 formed by the B-B' line, the frame structure F' includes a wall foot WF, a second wall section WP2, a second convex A2, and a second concave V2. Wherein, the second convex A2 protrudes on a part of the second inner surface of the second wall section WP2, and the second concave V2 is formed on another part of the second inner surface of the second wall section WP2 different from the second convex A2. Because the second convex A2 is located above the second concave V2, the frame structure F' in the B-B' cross-section will show the structure of upper convex and lower concave, as also shown in FIG. 6 and FIG. 7.

In this embodiment, the first panel 341 has the first end surface E1 toward the second concave V2 and the second panel 342 has the second end surface E2 toward the second convex A2. If the distance between the first end surface E1 of the first panel 341 and the second concave V2 is D2, and the distance between the second end surface E2 of the second panel 342 and the second convex A2 is d2, then it is preferred that D2 is 2~3 times of the d2, but not limited to this case.

It should be noticed that larger deformation is easily generated on the central part of the display 3 due to its poorer rigidity. In order to prevent this drawback, the distance d1 between the first end surface E1 of the first panel 341 and the first convex A1 shown in the A-A' cross-section of the display 3 of FIG. 4 closer to the central part of the display 3 is smaller than the distance d2 between the second end surface E2 of the second panel 342 and the second convex A2 shown in the B-B' cross-section of the display 3 of FIG. 5, so that the drawback that the larger deformation easily generated on the A-A' cross-section of the display 3 of FIG. 4 closer to the central part of the display 3 due to its poorer rigidity can be effectively improved.

After comparing FIG. 4 with FIG. 5, it can be found that the frame structure F of upper concave and lower convex shown in the A-A' cross-section of FIG. 4 is obviously different from the frame structure F' of upper convex and lower concave shown in the B-B' cross-section of FIG. 5. That is to say, a first protruding position of the first convex A1 is closer to the wall foot WF of the first sidewall SW1 than a second protruding position of the second convex A2; a second position of the second concave V2 is closer to the wall foot WF of the first sidewall SW1 than a first position of the first concave V1. The first convex A1 is more protruding than the second concave V2, and the second concave V2 and the first convex A1 are adjacent along the extension direction of the first sidewall SW1. The second convex A2 is more protruding than the first concave V1, and the first concave V1 and the second convex A2 are adjacent along the extension direction of the first sidewall SW1.

In addition, from FIG. 6 and FIG. 7, it can be found that the first sidewall SW1 includes a plurality of first convex A1 and a plurality of second convex A2. Wherein, each first convex A1 can have different widths along the direction of the first sidewall SW1, and each second convex A2 can also have different widths along the direction of the first sidewall SW1, but not limited to this case.

From FIG. 6 and FIG. 7, it can be found that the second sidewall SW4 of the sidewalls is disposed opposite to the first sidewall SW1. In this embodiment, the structure of the second sidewall SW4 is the same with the first sidewall SW1, but not limited to this case. The second sidewall SW4 includes a third wall section WP3 and a fourth wall section WP4, and the third wall section WP3 and the fourth wall section WP4 are closely distributed along an extension direction of the second sidewall SW4.

From FIG. 4 through FIG. 7, it can be found that the convexes and the concaves of the rubber frame wall in the display 3 of the invention are interlaced along the horizontal Y-axis direction or the vertical Z-axis direction to disperse the over-concentrated force originally acted on the composite panel 34 of the display 3 to prevent the frame glue FG between the color filter substrate CF and the thin-film transistor substrate TFT from being forced to be separated.

Figure 8:
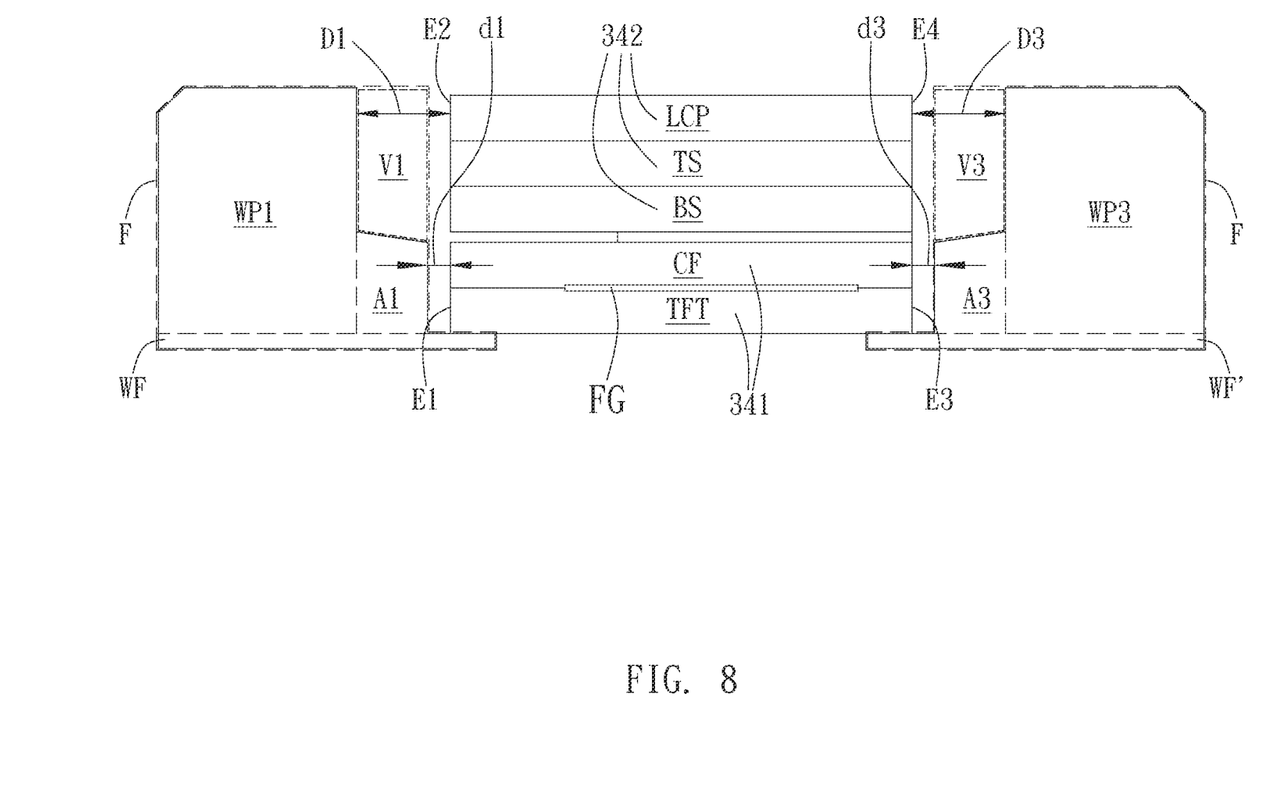
FIG. 8 illustrates a schematic diagram of the frame structure further including a third wall section and a third convex corresponding to a first wall section and a first convex.
Figure 9:
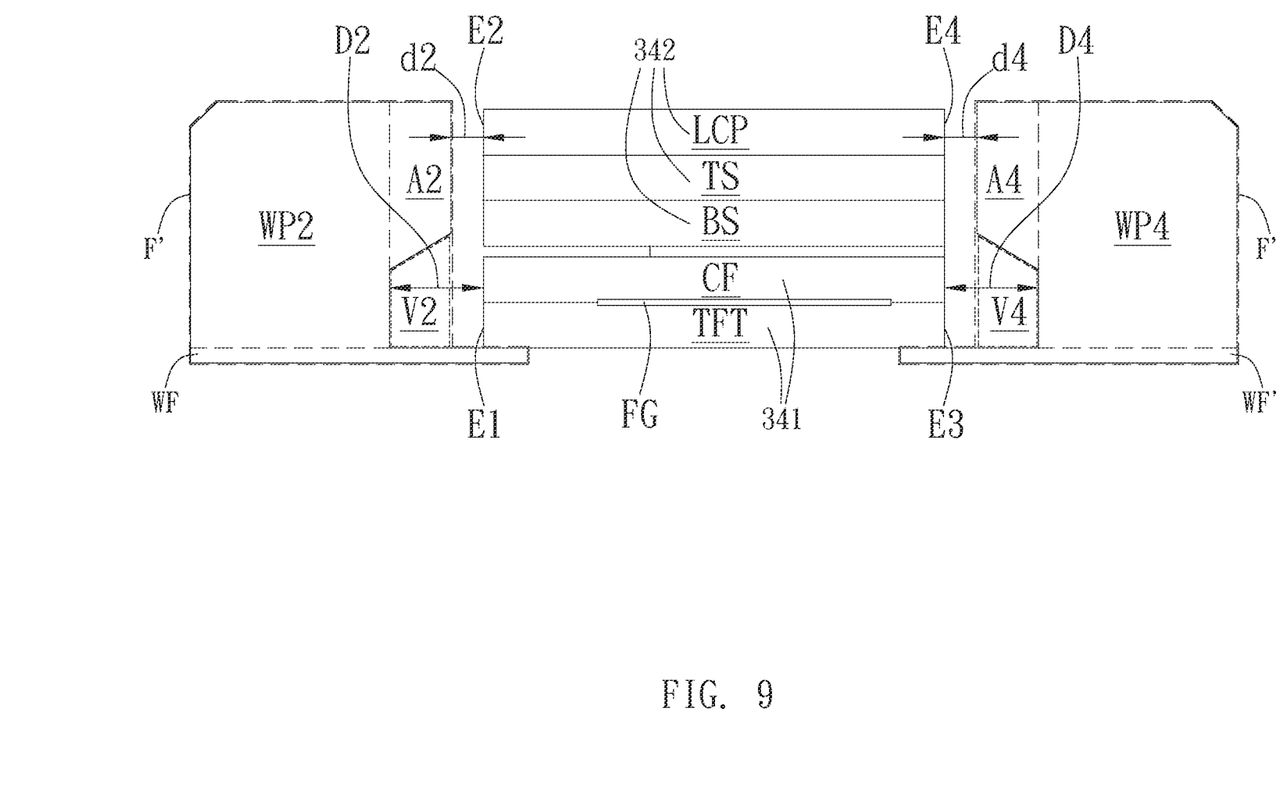
FIG. 9 illustrates a schematic diagram of the frame structure further including a fourth wall section and a fourth convex corresponding to a second wall section and a second convex.

Please also refer to FIG. 8 and FIG. 9. FIG. 8 illustrates a schematic diagram of the frame structure F further including a third wall section WP3 and a third convex A3 corresponding to the first wall section WP1 and the first convex A1; FIG. 9 illustrates a schematic diagram of the frame structure F further including a fourth wall section WP4 and a fourth convex A4 corresponding to the second wall section WP2 and the second convex A2.

As shown in FIG. 8 and FIG. 9, the frame structure F further includes the third convex A3 corresponding to the first convex A1 and the fourth convex A4 corresponding to the second convex A2. Wherein, the third convex A3 protrudes on a part of a third inner surface of the third wall section WP3 and the fourth convex A4 protrudes on a part of a fourth inner surface of the fourth wall section WP4. A third protruding position of the third convex A3 is closer to the wall foot WF' of the second sidewall SW4 than a fourth protruding position of the fourth convex A4 does. The first panel 341 has a third end surface E3 toward the third convex A3 and the second panel 342 has a fourth end surface E4 toward the fourth convex A4. Similarly, the frame structure F further includes a third concave V3 corresponding to the first concave V1 and a fourth concave V4 corresponding to the second concave V2. The third concave V3 is formed on another part of the third inner surface of the third wall section WP3 different from the third convex A3; the fourth concave V4 is formed on another part of the fourth inner surface of the fourth wall section WP4 different from the fourth convex A4.

In addition, it is preferred that the third wall section WP3 and the fourth wall section WP4 of the second sidewall SW4 are symmetrically arranged, the third wall section WP3 of the second sidewall SW4 and the first wall section WP1 of the first sidewall SW1 are symmetrically arranged, and the fourth wall section WP4 of the second sidewall SW4 and the second wall section WP2 of the first sidewall SW1 are symmetrically arranged, but not limited to these cases.

In FIG. 8, the first panel 341 has the third end surface E3 toward the third convex A3 and the second panel 342 has the fourth end surface E4 toward the third concave V3. If the distance between the third end surface E3 of the first panel 341 and the third convex A3 is d3, and the distance between the fourth end surface E4 of the second panel 342 and the third concave V3 is D3, then it is preferred that D3 is 2~3 times of the d3, but not limited to this case. As to the relationship between D1 and D3, it can be that D1 equals to D3, D1 is larger than D3, or D1 is smaller than D3 without any specific limitations.

In FIG. 9, the first panel 341 has the third end surface E3 toward the fourth concave V4 and the second panel 342 has the fourth end surface E4 toward the fourth convex A4. If the distance between the third end surface E3 of the first panel 341 and the fourth concave V4 is D4, and the distance between the fourth end surface E4 of the second panel 342 and the fourth convex A4 is d4, then it is preferred that D4 is 2~3 times of the d4, but not limited to this case. As to the relationship between D2 and D4, it can be that D2 equals to D4, D2 is larger than D4, or D2 is smaller than D4 without any specific limitations.

In addition, the distance d3 between the third end surface E3 of the first panel 341 and the third convex A3 in FIG. 8 is smaller than the distance d4 between the fourth end surface E4 of the second panel 342 and the fourth convex A4 in FIG. 9 to prevent the A-A' cross-section closer to the center of the display 3 in FIG. 8 from generating larger deformation due to weaker rigidity.

In practical applications, the convexes (the first convex A1, the second convex A2, the third convex A3, and the fourth convex A4) and the concaves (the first concave V1, the second concave V2, the third concave V3, and the fourth concave V4) of the frame structure F can be designed to be different forms based on practical needs, not limited this case.

Another embodiment of the invention is a frame structure. In this embodiment, the frame structure is used in a display. The frame structure includes a first sidewall, at least one first convex, and at least one second convex. The first sidewall includes at least one first wall section and at least one second wall section. The first wall section and the second wall section are closely distributed along an extension direction of the first sidewall. The at least one first convex protrudes on a part of an inner surface of the first wall section. The at least one second convex protrudes on a part of an inner surface of the second wall section. A protruding position of the first convex is closer to a wall foot of the first sidewall than a protruding position of the second convex. As to the detail of the frame structure in this embodiment, please refer to the above-mentioned embodiment, it is not described again here.

Compared to the prior art, the display and the frame structure thereof disclosed by the invention can effectively disperse the force originally acted on the composite panel of the display by using the design of the rubber frame wall having different widths at different positions, therefore, it can prevent the frame glue between the color filter substrate and the thin-film transistor substrate from being separated by force, and the 3D liquid crystal display can normally display image without anomalies.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A frame structure, applied in a display, the frame structure comprising:
   a first sidewall, comprising at least one first wall section and at least one second wall section, the first wall section and the second wall section being closely distributed along an extension direction of the first sidewall;
   at least one first convex, protruding on a part of a first inner surface of the first wall section; and
   at least one second convex, protruding on a part of a second inner surface of the second wall section;
   wherein a first protruding position of the first convex is closer to a wall foot of the first sidewall than a second protruding position of the second convex, the first wall section is closer to an end of the first sidewall along the extension direction than the second wall section and the second convex is more protruding than the first convex.

2. The frame structure of claim 1, further comprising a first concave formed on another part of the first inner surface of the first wall section different from the first convex, and the second convex is more protruding than the first concave.

3. The frame structure of claim 2, wherein the first concave and the second convex are adjacent along the extension direction of the first sidewall.

4. The frame structure of claim 1, further comprising a second concave formed on another part of the second inner surface of the second wall section different from the second convex, and the first convex is more protruding than the second concave.

5. The frame structure of claim 4, wherein the second concave and the first convex are adjacent along the extension direction of the first sidewall.

6. The frame structure of claim 1, wherein the second wall section is closer to an end of the first sidewall along the extension direction than the first wall section.

7. The frame structure of claim 6, further comprising a frame covering an outer surface and a wall top of the first sidewall, wherein the outer surface is opposite to the inner surface of the first sidewall, and the wall top is opposite to the wall foot.

8. The frame structure of claim 6, wherein the first convex is more protruding than the second convex.

9. The frame structure of claim 1, further comprising a frame covering an outer surface of the first sidewall and supporting the wall foot from outside, wherein the outer surface is opposite to the inner surface of the first sidewall.

10. The frame structure of claim 1, further comprising:
    a second sidewall, opposite to the first sidewall, the second sidewall comprising a third wall section and a fourth wall section closely distributed along an extension direction of the second sidewall;
    a third convex, protruding on a part of a third inner surface of the third wall section; and
    a fourth convex, protruding on a part of a fourth inner surface of the fourth wall section;
    wherein a third protruding position of the third convex is closer to the wall foot of the first sidewall than a fourth protruding position of the fourth convex, and the third convex is opposite to the first convex and the fourth convex is opposite to the second convex.

11. The frame structure of claim 1, comprising a plurality of first convex, wherein each first convex has different widths along the direction of the first sidewall.

12. The frame structure of claim 1, comprising a plurality of second convex, wherein each second convex has different widths along the direction of the first sidewall.

13. A display, comprising:
    a frame structure, comprising:
    a plurality of sidewalls enclosing an inner space of the frame structure, wherein the plurality of sidewalls comprises a first sidewall, and the first sidewall comprises a first wall section and a second wall section closely distributed along an extension direction of the first sidewall;
    a first convex, protruding on a part of a first inner surface of the first wall section; and
    a second convex, protruding on a part of a second inner surface of the second wall section;
    wherein a first protruding position of the first convex is closer to a wall foot of the first sidewall than a second protruding position of the second convex; and
    a composite panel, enclosed by the frame structure, the composite panel comprising:
    a first panel, having a first end surface toward the first convex; and
    a second panel, superimposed on the first panel, the second panel having a second end surface toward the second convex;
    wherein the frame structure further comprises a first concave formed on another part of the first inner surface of the first wall section different from the first convex and corresponding to the second end surface of the second panel, and the second convex is more protruding than the first concave, the distance between the first concave and the second end surface is 2~3 times of the distance between the first convex and the first end surface.

14. The display of claim 13, wherein the first concave and the second convex are adjacent along the extension direction of the first sidewall.

15. The display of claim 13, wherein the frame structure further comprises a second concave formed on another part of the second inner surface of the second wall section different from the second convex and corresponding to the first end surface of the first panel, and the first convex is more protruding than the second concave.

16. The display of claim 15, wherein the second concave and the first convex are adjacent along the extension direction of the first sidewall.

17. The display of claim 15, wherein the distance between the second concave and the first end surface is 2~3 times of the distance between the second convex and the second end surface.

18. The display of claim 13, wherein the second wall section is closer to an end of the first sidewall along the extension direction than the first wall section.

19. The display of claim 18, further comprising a frame covering an outer surface and a wall top of the first sidewall, wherein the outer surface is opposite to the inner surface of the first sidewall, and the wall top is opposite to the wall foot, and the frame also partially shelters the outer surface of the second panel.

20. The display of claim 18, wherein the distance between the first convex and the first end surface is smaller than the distance between the second convex and the second end surface.

21. The display of claim 13, wherein the first wall section is closer to an end of the first sidewall along the extension direction than the second wall section.

22. The display of claim 21, further comprising a frame covering an outer surface of the first sidewall and supporting the wall foot from outside, wherein the outer surface is opposite to the inner surface of the first sidewall.

23. The display of claim 21, wherein the distance between the first convex and the first end surface is larger than the distance between the second convex and the second end surface.

24. The display of claim 13, wherein the plurality of sidewalls further comprises:
   a second sidewall, disposed opposite to the first sidewall, the second sidewall comprises a third wall section and a fourth wall section closely distributed along an extension direction of the second sidewall;
   the frame structure further comprises:
   a third convex, protruding on a part of a third inner surface of the third wall section; and
   a fourth convex, protruding on a part of a fourth inner surface of the fourth wall section;
   wherein a third protruding position of the third convex is closer to the wall foot of the second sidewall than a fourth protruding position of the fourth convex, and the third convex is opposite to the first convex and the fourth convex is opposite to the second convex;
   wherein the first panel has a third end surface toward the third convex, and the second panel has a fourth end surface toward the fourth convex.

25. The display of claim 13, comprising a plurality of first convex, wherein each first convex has different widths along the direction of the first sidewall.

26. The display of claim 13, comprising a plurality of second convex, wherein each second convex has different widths along the direction of the first sidewall.

* * * * *